United States Patent [19]

Connolly et al.

[11] Patent Number: 4,540,488
[45] Date of Patent: Sep. 10, 1985

[54] ION EXCHANGE COLUMNS

[75] Inventors: Paul A. Connolly, Seascale; Barry G. Weston, Gosforth, both of England

[73] Assignee: British Nuclear Fuels Limited, Warrington, England

[21] Appl. No.: 567,515

[22] Filed: Jan. 3, 1984

[30] Foreign Application Priority Data

Jan. 20, 1983 [GB] United Kingdom ............... 8301502

[51] Int. Cl.³ ........................................... B01J 47/02
[52] U.S. Cl. .................................. 210/268; 210/189; 210/289
[58] Field of Search ........................ 137/550, 625.32; 210/189, 268, 289, 291

[56] References Cited

U.S. PATENT DOCUMENTS 1,855,904  4/1932  Brown et al. ..................... 210/268

Primary Examiner—Ivars Cintins
Attorney, Agent, or Firm—Larson and Taylor

[57] ABSTRACT

The lower end of an ion exchange column is provided with a rotatable valve member which, in a first position, supports resin material in the column and, in a second position, allows the resin material to drop out of the column. The valve member can include a sintered body which in the first position supports the resin material and permits drainage of reagents introduced into the column. On rotating the valve member into its second position the sintered body can fall out of the valve member to permit the resin material to fall out of the column through the valve member. A replacement sintered body can be dropped down the column on to the valve member and the column can be refilled with resin material for further use.

9 Claims, 5 Drawing Figures

ION EXCHANGE COLUMNS

The present invention concerns ion exchange columns.

BACKGROUND OF THE INVENTION

It is known to support resin within an ion exchange column by means of a plug of silica wool. However, it is necessary to renew the plug and resin for each new sample being analysed. This is time consuming and tedious. In addition there can be wide variations in column drain times due to differences in packing densities of the silica wool plugs.

FEATURES AND ASPECTS OF THE INVENTION

According to the present invention there is provided an ion exchange column having a valve member at its lower end in which the valve member is movable between a first position to support the contents of the column and permit drainage from the column and a second position to permit discharge of the contents of the column.

Conveniently, a rotatable valve member having a through bore is positioned at the base of the column with a seat for a sintered closure member being provided at at least one end of the bore whereby with said one end at the base of the column the seated sintered closure member supports the material in the column and on rotating the valve member to bring the opposite end of the bore into position at the base of the column the sintered closure member is moved to a position at which it can fall from its seat to thereby release the ion exchange material in the column.

DESCRIPTION OF THE DRAWINGS

The invention will be described further, by way of example, with reference to the accompanying drawings; in which.

DESCRIPTION OF THE PREFERRED EMBODIMENTS

Figure 1:
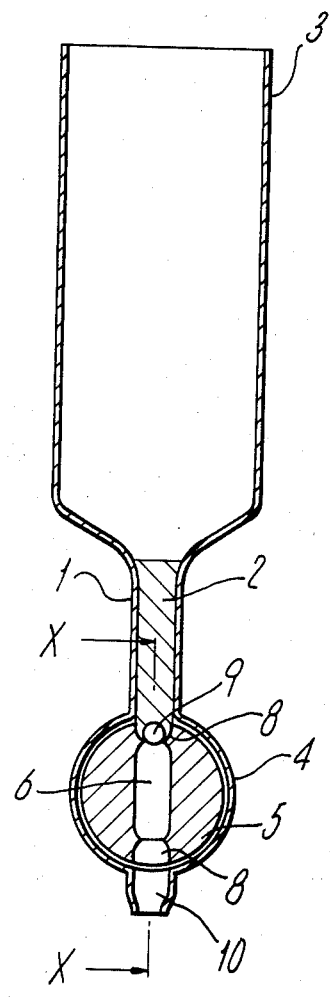
FIG. 1 is a longitudinal section through a first embodiment of a rechargeable ion exchange column.
Figure 2:
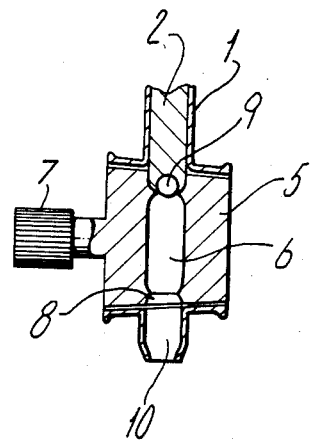
FIG. 2 is a section on X—X in FIG. 1.

In FIG. 1, a column 1 containing an ion exchange resin 2 has a reservoir 3 at its upper end and communicates with a valve housing 4 at its lower end. The reservoir 3, and also the housing 4, can be integral with the column 1 or can be detachably secured to the column 1. The column 1, reservoir 3 and housing 4 are conveniently glass.

A valve member 5 having a through bore 6 is rotatably mounted within the housing 4. The valve member 5 is rotatable either manually or by a motorised drive through a coupling 7 on the valve member spindle. Each end of the bore 6 is shaped to provide a seat 8 for a closure member 9. The closure member 9 is porous such as to support the resin material in the column 1 while allowing passage of liquid reagents and working liquids introduced into the column from the reservoir. Conveniently, the closure member 9 can be a sphere of sintered glass although it can take other forms such as discs, cylinders and the like.

In use, the valve member is arranged with its bore 6 substantially coaxial with the axis of the column. A sintered sphere is dropped down the column from the reservoir to rest in the seat at the upper end of the bore 6. Thereafter resin material is introduced into the column from the reservoir and the material will be supported in the column by the sphere 9 which blocks off the bore 6 to the passage of the resin material. This is the position shown in FIG. 1.

The ion exchange process is then performed in a conventional manner. Column conditioning reagents can first be passed through the column to drain through the sintered sphere and the bore 6. This can be followed by a sample to be analysed, then resin washing reagents to removed unwanted components and finally by an eluting reagent.

On completion of the ion exchange process the valve member is rotated through 180°. The sintered sphere drops out of its seat and falls through the outlet 10 in the valve body. The resin material, being no longer supported, also falls out of the column through the bore 6 and the outlet 10. A column washing reagent, usually either water or the same as the column conditioning reagent, is passed through the column 1 and the bore 6 to cleanse the column and bore prior to further use. Thereafter a new sintered sphere is located on the seat at the top of the bore and the column is filled with fresh material and the operations can be repeated.

It will be appreciated that it is not necessary to form a valve seat at each end of the bore 6. A valve seat at one end only is sufficient as the valve member 5 is rotatable between upper and lower positions. Further, although a sintered glass valve closure member is described it will be realised that other sintered materials are available.

Figure 3A:
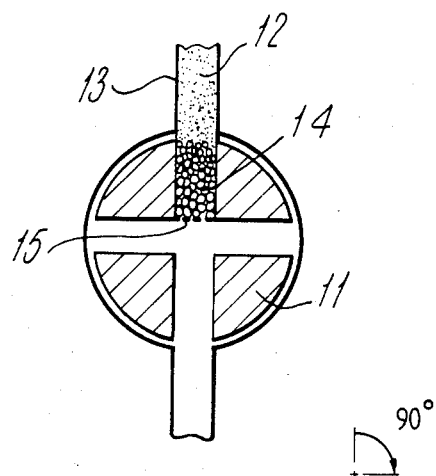
FIGS. 3a, 3b and 3c show a second embodiment of the invention in different stages of operation.
Figure 3B:
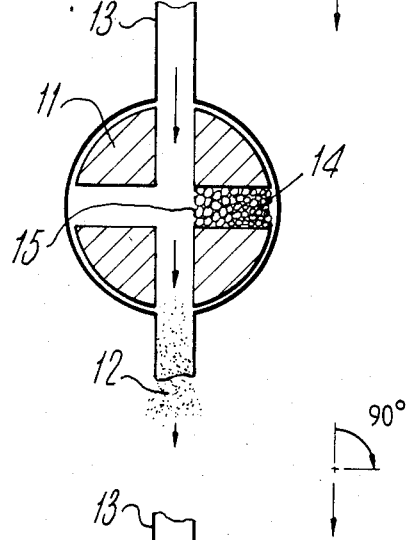
Figure 3C:
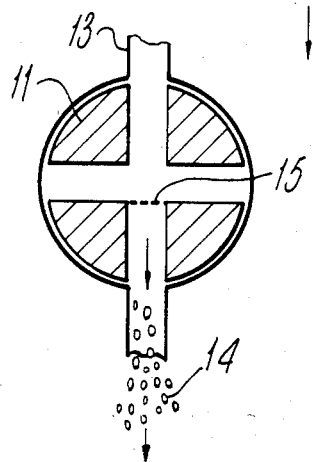

In the embodiment of FIG. 3, valve member 11 is formed with intersecting bores. In FIG. 3a, the valve member is in position to support resin material 12 in column 13. One leg of the valve member 11 is packed with small glass spheres 14 which are carried on a perforated grid 15, such as a wire mesh or gauze, arranged at the end of the leg remote from the column. In the position of FIG. 3a the small glass spheres 14 support the resin material 12 in the column. On completion of an ion exchange process and to recharge the column 13 the valve member 11 is rotated through a quarter turn to the position of FIG. 3b to allow the resin material to drop out of the column. Rotation of the valve member through a further quarter turn permits discharge of the glass spheres 14 as shown in FIG. 3c. Thereafter the valve member can be returned to the FIG. 3a position to receive a fresh supply of spheres and the column can be recharged with resin material.

As an alternative, it may be possible to size the grid 15 such that it will directly support the resin column without recourse to the use of the spheres 14. In such an arrangement the grid 15 will be arranged at the end of the leg adjacent the end of the column in the position occupied by the valve member in FIG. 3a.

By means of the rotatable valve member, a column can be prepared, unpacked and washed for reuse in a simple and efficient manner.

We claim:

1. An ion exchange column including an upright chamber to receive ion exchange resin, inlet means at the upper end of the chamber to allow the introduction of resin into the chamber and to provide an inlet for a liquid to be treated, outlet means at the lower end of the chamber, the outlet means comprising a valve member having a rotatable body, at least one bore through the body, the body being rotatable between a first position to support ion exchange resin in the chamber and at the same time to permit drainage of treated liquid from the chamber through the bore and a second position to permit discharge of ion exchange resin from the chamber.

2. An ion exchange column according to claim 1 in which the valve member comprises a seat at at least one end of the bore, a porous closure member located on the seat whereby in said first position the closure member on its seat supports ion exchange resin in the chamber and in said second position the closure member falls off its seat to permit discharge of ion exchange resin from the chamber.

3. An ion exchange column according to claim 2 in which the closure member comprises a sintered material.

4. An ion exchange column according to claim 3 in which the closure member comprises a sphere of sintered material.

5. An ion exchange column according to claim 1 in which the valve member comprises a body having two intersecting through bores, a grid being positioned across one of the bores.

6. An ion exchange column according to claim 5 in which the grid is positioned at an end of one of the bores to support ion exchange resin in the chamber when the valve member is in said first position.

7. An ion exchange column according to claim 5 in which the grid is located within one of the bores at a position adjacent the intersection of the bores, a porous bed on the grid for supporting ion exchange resin in the chamber when the valve member is in said first position.

8. An ion exchange column according to claim 7 in which the porous bed comprises glass spheres.

9. An ion exchange resin column according to claim 1 further comprising ion exchange resin in said chamber.

* * * * *